United States Patent Office 2,916,103
Patented Dec. 8, 1959

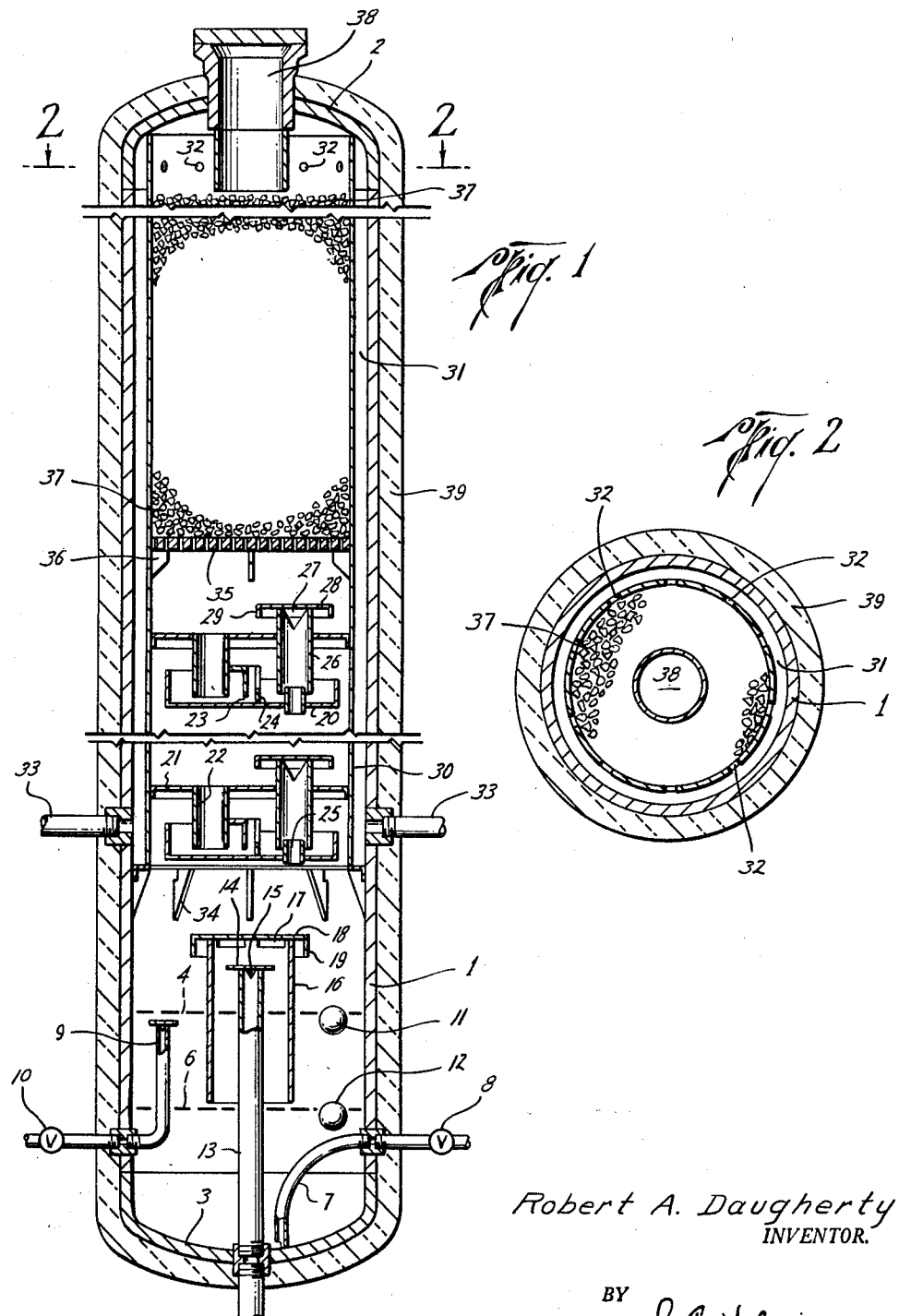

2,916,103

SEPARATOR OF WELL FLUIDS

Robert A. Daugherty, Aztec, N. Mex., assignor to The Fish Engineering Corporation, Houston, Tex., a corporation of Delaware Application June 3, 1957, Serial No. 663,262

4 Claims. (Cl. 183—2.7)

This invention relates to liquid and gas separators and more particularly to improved apparatus especially designed for use at a gas well location to remove oil and water from well production fluid so that only predominantly dry gas is sent through the gas gathering pipe lines leading from the field.

A well tapping a pressure gas sand within the earth often produces along with combustible gas, small quantities of either or both oil and water, and the production fluid usually issues at a temperature somewhat in excess of eighty degrees Fahrenheit and under pressures often controlled at around one hundred pounds per square inch, and an object of the present invention is to provide for riddance of liquids from production fluid immediately it reaches the surface and for further separation of salable oil from waste water, with the outgoing gas line receiving delivery of a gas stream from which moisture has been effectively extracted.

A further object of the invention is to provide an improved tower or pressure vessel conveniently divided into successive flow chambers for fluid separation in stages into its liquid, water vapor entrained gas and dry gas phases, inclusive of a first liquid and gas separating chamber containing a trap wherein oil and water separation also occurs, and second and third dehydrating chambers and a final heat insulating chamber through which dry gas flows in protective relation to the dehydrating chambers and especially the third chamber containing dehydration pellets which thereby are maintained at a substantially uniform temperature for effectively guarding against their fusion together, as tends to occur with sudden temperature changes.

Another object of the invention is to effect separation of liquid from the incoming pressure stream within the first chamber by an arrangement of deflector baffles co-operating to partition the chamber and confine the uprising fluid stream separated by gravity from the heavier liquid for passage upwardly through a labyrinth to effect separation of stream entrained liquid particles by inertia and downward rebound deflection and also confining the separated heavier liquid to drop downwardly within the partitioned passage as an addition to liquid previously trapped within the chamber bottom and undergoing gravity separation of the oil and water components so that the downflow through the confined partition passage gives minimum disturbance to the liquid body without undue agitation thereof, and without surge in liquid level whose control is by valved outlets dependent on level sensitive and signal transmitting floats positioned outside the partitioned passage.

A still further object of the invention is to provide a jacket around the final dehydration chamber for the down flow of dry gas in the form of a moving sheet blanket surrounding the chamber and stabilizing the temperature of the chamber and its contents through which the gas stream, after having left the liquid separating chamber, passes upwardly and has absorbed therefrom any residual water vapor by a dehydration material introduced into the chamber as a mass or pack of pellets and which material slowly dissolves in and combines with the extracted moisture for descent from the chamber as a brine and whose efficacy is dependent largely on pellet independency to preserve a multiplicity of small but free-flow passages afforded by the interstices between abutting solid pellets and which pellet individuality would be lost if the moist contact surfaces of adjoining pellets were to fuse together, as tends to occur with a rapid drop in temperature and then results in an objectionable bridging and channeling of the integrated mass and causes loss in the rate of vapor extraction.

Other objects and advantages will become apparent from the following specification having reference to the accompanying drawing wherein Fig. 1 is a transverse vertical cross section of a preferred but not necessarily the only embodiment of the improved apparatus, and Fig. 2 is a transverse section as on line 2—2 of Fig. 1.

As shown in the drawing, the tower involves a vertically disposed cylindrical housing or casing 1 having top and bottom end closure headers 2 and 3. In vertical succession there are enclosed within the housing a bottom water and oil and gas separation chamber, an intermediate chamber having a series of superposed reflux brine trays for co-operation with an upflowing gas stream for the initial absorption of vapor moisture from the stream, and an upper chamber to contain solid pellets of dehydration material, such as calcium chloride, for further moisture removal. Preferably, these several chambers are combined in a single unit assembly but they could be constituted by separate housings joined in series relation and positioned either one on top of the other or side by side one another.

Referring first to the lower chamber, this forms at the closed bottom thereof a liquid trap in which liquid separated from the incoming fluid stream is retained for the gravity separation of liquid oil and water. The upper oil level is indicated at 4 and the top level of the lower water layer is indicated at 6. The ratio of liquid and gas from a gas well ordinarily is such that the liquid content is relatively small and water and oil separation can readily occur in a fairly small trap in the absence of excessive liquid additions to the liquid body. Exterior sight gauges may be employed for visual observation of relative levels, and the levels can be maintained as desired by withdrawals of oil and water through suitable valved outlets such as a water outlet indicated as a curved tube 7 running upwardly from the bottom of the trap and out through the side wall of the casing 1 and containing a control valve 8, the oil outlet being indicated as a tube 9 having its inlet near the top of the oil level 4 and passing to the outside of the vessel with a control valve 10. Automatic valve operation is contemplated and can be effected with mechanical linkage or any conventional pneumatic, electric, hydraulic or other power valve operating mechanism under control of an oil level float 11 and a water level float 12 located in the entrapped body of liquid.

Well production fluid is delivered interiorly of the lower chamber from a closely adjacent well through a conduit or pipe 13 extending upwardly through the bottom header 3 and terminating in a discharge end slightly above the upper liquid level 4 of the chamber entrapped liquid. Over the top of the entry pipe 13 is a closure plate 14 which baffles or deflects the pressure stream laterally outwardly through one or more openings 15 in the pipe side wall immediately below the closure plate 14. The opening 15 illustrated is a V-shaped notch cut in the upper edge of the delivery pipe 13 so that its sides converge downwardly from the underside of the horizontal deflector plate 14, and its size is such in relation to the fluid pressure and flow area of the delivery pipe 13 that in co-operation with the closure plate 14, the fluid stream leaves the inlet pipe 13 as a horizontally directed jet in a spreading fanned path. A gravity separation tendency will urge the heavier liquid downwardly as the lighter gas streams upwardly. With sufficiently high stream pressure, the laterally deflected inrushing stream will forcibly strike against and bounce off a vertical baffle wall spaced transversely a short distance from the inlet pipe discharge opening 15 and stream column and direction will be broken for a turbulence which better insures liquid drop into the liquid trap and the continued rise of the lighter gas stream.

This last mentioned deflector wall 16 as shown consists of a vertically disposed tube or cylinder in surrounding spaced concentric relation to the delivery pipe 13 and it projects above and below the discharge jet opening 15. In its upper edge it has a series of lateral outflow vents 17 beneath a welded-on hood or inverted cup 18, which is of larger diameter than and projects radially beyond the cylindrical wall 16 and terminates peripherally in a dependent annular skirt 19 of a depth somewhat greater than the vertical dimension of the vent openings 17. The underside of the hood 18 provides a horizontal baffle surface against which the upflowing stream impinges, whereby the heavier liquid particles entrained in the lighter gas will tend by inertia to move out of the angularly directed stream and to rebound and drop downwardly. Some of the liquid particles may be swept by the force of the oncoming fluid stream outwardly along the underside of the hood to move on through the side openings 17 and against the peripherally dependent skirt 19, which is in the path of the laterally moving gas stream, so as to deflect the same downwardly before the stream passes on upwardly from the larger diameter upper portion of the separating chamber. On entering the larger chamber space, the gas may expand and slightly decrease in flow velocity, and liquid particles along the underside of the hood 18 will run down and drop off the lower edge of the skirt 19 and toward the liquid trap through the eddying gas stream. Some of such droplets may be thrown against and run down the inside of the vessel wall 1. At this stage practically all of the liquid content will have been disengaged from the gas and deposited with the entrapped liquid body and most of the liquid separation action will have occurred as the fluid entered at the discharge end of the well connection pipe 13 and within the central cylindrical space partitioned off from the major part of the chamber space by the annular wall 16.

The collected liquid body held at the bottom of the chamber will separate by gravity into its lighter and heavier constituents and form upper and lower layers of oil and water whose respective heights are controlled by removal of excesses through the valved pipes 7 and 9. The downward extension of the wall 16 below the discharge jet opening 15 is for a distance that its lower edge is considerably below the top liquid level 4. Accordingly, the liquid particle droppings interiorly of the partition wall 16 are confined to a relatively small central portion of the chamber diameter. This minimizes surface splashes and violent disturbance of the main body of liquid in the larger portion of the chamber containing the level sensitive floats 11 and 12, and the partitioned central passage space affords a small quieting chamber so that major liquid additions separated from the incoming fluid stream enter the trap without causing severe agitation and level surges to interfere with either gravity separation of oil and water or smooth float responses.

Following initial removal of liquid, there will be some residual water vapor entrained in the upwardly rising stream from the liquid separation chamber. Much of such water vapor can be separated from the gas as it streams through the intermediate or second chamber containing a stack of superposed reflux trays in series succession with communicating flow passages therebetween whereby the gas stream is repeatedly brought into intimate contact with and disengaged from a brine or water solution of dehydrating material. After being washed through the brine, the oncoming gas stream goes on through the third chamber, packed with a dehydrating material which absorbs and dissolves into the remaining water vapor and drops downward as a brine, first into the uppermost of the stack of reflux trays and then progressively downwardly through the stack, becoming less concentrated as vapor is absorbed and finally dripping into the bottom liquid trap. For common well flow volumes and by way of example of a compact assembly, a satisfactory tower unit may include a series group of about five vertically spaced apart reflux trays within a vertical distance on the order of three and a half feet and an upper dehydrating chamber on the order of four and a half feet high in a tower of about twenty-six inches diameter and an over-all height of about ten and a half feet.

The structure and operation of the several brine-gas combining and separating units are the same in each instance. For simplicity, the drawing shows only two of the superposed tray units, but regardless of number, the stack will consist of alternately disposed trays 20 and dropping brine receiving or collecting walls 21. Each collector wall 21 is a circular plate marginally welded and sealed to a cylindrical wall 30 fitted concentrically within the outer housing wall 1, as will later be referred to. Offset in one side of the plate 21 is a dependent tube 22 to lead drippings of brine solution downwardly into one of two side by side compartments of the next lower tray 20. The brine receiving tray compartment has a higher side wall than does its companion compartment, and brine liquid supplied in excess of said wall levels spills over to the next collecting plate. Communication between the two compartments is through a metered opening 23 at the bottom of the divider wall between the two compartments, and the size of the opening 23 is predetermined to control the amount of brine solution which it is desired to recirculate at the particular refluxing unit. Normally the amount to be recirculated will be slightly less than the amount supplied through the downflow tube 22, and that excess spills over and descends to the next tray and finally into the bottom chamber. Beyond the divider opening 23 there is a vertical wall or dam 24 over which the brine from the receiving compartment spills into the companion tray compartment and with which is associated an eductor consisting of an upstanding tube 25 opening through the bottom of the tray and having its upper end fitted into the lower end of a larger diameter riser tube 26 which passes through the superposed plate 21. With the annular clearance between adjoining ends of the tubes 25 and 26 near the brine level in the tray compartment, the uprushing stream of pressure gas passing from the tube 25 to the tube 26 will draw and raise some of the brine liquid with somewhat of an atomizing effect for diffusion and admixture with the gas whereby to absorb water vapors. The upper passage of the stream mixture through the riser tube 26 is deflected laterally therefrom at small V-shaped openings 27 cut into the top edge of the tube and by the co-operating overlying hood or cap 28 having a peripheral deflector flange 29 whereby the mixed gas and brine will disengage each other. The brine will return for recirculation and the gas will go on through the tray stack. By reason of this scrubbing action at each reflux unit, the onflowing gas will be drier and the brine solution will be less concentrated, and with the repetition of this dehydrating action at successive trays, it follows that the brine solution will be of least concentration at the lowermost tray and that water vapor content will decrease as the stream rises. Relatively little water vapor remains in the stream passing through and mixing with the most highly concentrated brine at the uppermost tray and the small remaining water vapor is effectively treated.

The outlet from the tray containing chamber leads directly to the inlet of the third chamber and the latter is constituted by the interior space within the aforementioned cylindrical wall 30. Preferably and as the drawing shows, this wall is of a vertical length to extend throughout the combined heights of the second and third chambers and is of smaller diameter than the outer shell or housing wall 1, whereby the dehydrating chambers have double or spaced apart and concentric tubular walls. The intervening space 31 between the concentric walls 1 and 30 provides an annular hollow jacket or downflow chamber surrounding the dehydrating chambers and having an inlet flow communication at the upper adjoining ends of inner and outer chambers, through a number of circumferentially spaced apart openings 32 cut through the inner wall 30. Outflow from the jacket chamber 31 preferably is by at least two diametrically opposed legs 33—33 of an outlet manifold connected with a collecting pipe line. By this arrangement the stream of dehydrated gas leaving the outlet at the top of the upper dehydrating chamber will be evenly distributed annularly for flow downwardly toward the ground through the outer jacket 31 in a circular sheet or heat stabilizing shroud.

At its upper end the inner tubular wall 30 is closely seated against the top header 2, and at its lower end at the inlet to the central chamber space the wall rests on a series of brackets or supporting arms 34 welded interiorly of the shell 1. Between the outlet from the second chamber and the inlet to the third chamber is a perforated wall or grate 35 which at its periphery rests on supporting arms 36 welded interiorly of the shell 30. On top of the grate 35 the upper chamber space contains a body of dehydrating material in the form of individual pellets 37 of calcium chloride or the like. A normally covered fill opening 38 in the upper header 2 enables periodic recharging of the pellets, whose initial size can be on the order of walnuts or chunks of about one and a quarter inches thick.

A pack of individual solid pellets of rounded or irregular shape will have intervening spaces between neighboring pellets of varying size for a multiplicity of tortuous paths in which the pressure moving gas breaks up into thin streams and has presented thereto a maximum surface area having an affinity for moisture and over which the divided gas streams scrub. Residual water vapor in the gas is readily taken up in the calcium chloride exposed to the water vapor and the calcium chloride dissolves into and combines with the water for forming liquid brine, which then drops downwardly for action in the reflux trays, as before described.

The division of the gas flow into a multitude of thin turbulent streams insures the utmost working of the gas particles and keeps down the volume of dehydrating material required, and therefore the over-all height of the tower. Efficiency is dependent on the maintenance of the dehydrating pellets as individual pieces. When their surfaces become moist as a part of the action of dissolution, they may tend to fuse together, but it has been found that they will maintain their individual condition in the absence of a sudden temperature drop and at a temperature level above approximately sixty degrees Fahrenheit. A temperature drop takes place with moisture absorption, but usually the temperature of the incoming well gas is sufficiently high that a wide drop or a chamber temperature below sixty degrees Fahrenheit will not occur from heat of absorption alone and in the absence of considerable heat loss to outside atmosphere. Should fusing and pack solidification occur, the minute intervening passages become blocked and resultant back pressure eventually channels a flow path with bridging of the fused-together mass of calcium chloride. Such channeling defeats the thorough final dehydrating step. Consequently, it is important that internal temperature be stabilized against rapid change and this is achieved by returning or directing dry gas down through the chamber enveloping jacket 31 as a flow curtain to surround and flood the exterior surface of the inner wall 30. Complete blanketing of the wall 30 by the annular sheet of dry gas circulating down through the jacket minimizes rapid heat transfer to outside atmosphere. As a retardant of heat transfer through the outer jacket wall 1 from the downflowing gas within the jacket space 31, a covering sleeve 39 of asbestos or other suitable insulating material is wrapped around the outside of the tower in those installations made in cold climates and working areas which frequently experience sudden and wide temperature drop.

There is thus provided an arrangement for stabilizing the temperature of the calcium chloride pellets and that of the brine within the refluxing trays for the prevention of rapid temperature fluctuation whereby fusing together of calcium chloride and its adherence to the inner surface of the vessel is avoided for reducing bridging and channeling. The solid particles remain as individual pieces for the most efficient extraction of water vapor within a relatively short length dehydration vessel.

While the foregoing description has been limited to the preferred embodiment as shown in the drawing, it is to be understood that such modifications may be made as come within the appended claims.

What I claim is:

1. For the treatment at a gas well location of well production fluid at the temperature and pressure of the issuing fluid and the separation from the flowing gas of liquids as may be produced with gas from the well, a separator assembly including a lower housing portion having a chamber for the gravity collection and entrapment of liquid oil and water and for the gravity separation of the oil and water components of the entrapped liquid, overflow control means connected with the chamber and operative to maintain a body of liquid in said chamber to a desired level, a well fluid inlet to the chamber terminated in an upwardly directed discharge end above said liquid body contained within the chamber, a deflector baffle transversely disposed in relation to the path of inlet fluid discharge to effect separation and downward rebound of liquid particles, a tubular flow directing wall surrounding said discharge end in inwardly spaced relation with the wall of the housing and extending partly above and partly below the level of said liquid body and co-operating with the fluid discharging inlet for liquid downflow and gas upflow of separated fluids and providing a quieting chamber at the surface of that portion of the liquid body which is confined interiorly of the tubular wall for minimizing surface disturbance of the liquid body in the annular space surrounding said tubular wall, a deflecting baffle co-operating with a portion of said wall and being spaced upwardly from the liquid level and in the path of fluid upflow from said inlet to further separate and cause drop-out of liquid from the upflowing gas stream, an upper housing portion having a chamber provided with a gas stream inlet from the lower housing portion and an outlet spaced from said inlet, a water soluble dehydrating material supplied to the chamber in individual pellet form and distributed as a packing throughout the diameter of the chamber between said inlet and outlet for the absorption of water vapor from the gas stream traveling through the chamber, a heat insulator hollow jacket surrounding and providing an annular flow space enclosing said upper housing portion between said inlet and said outlet, said hollow jacket having a discharge opening at its lower end and having an entrance opening at its upper end through which gas which has traveled through and yielded its water vapor to the dehydrating material passes from the chamber outlet for downflow through the jacket annular space to said discharge opening and a covering of heat insulation material on the outside of the upper housing jacket.

2. In an oil, water and gas separator of the character described, a first housing portion enclosing a chamber whose bottom constitutes a liquid collecting trap for the gravity separation therein of relatively light and heavy oil and water components and whose top constitutes a gas receiving space, a fluid delivery conduit discharging into the chamber above said liquid collecting trap, a partitioning wall in said chamber arranged to form therein an interior conductor compartment directly receiving fluid discharged from said conduit and serving to separate from the gas and direct liquid into said trap below the liquid level therein, a second housing portion enclosing a dehydration chamber having an inlet communicating with the gas receiving space and an outlet spaced from said inlet, a body of dehydrating material in the form of individual pellets packing the chamber space of the second housing portion for the travel therethrough of gas passing from the inlet to the outlet and for the absorption of water vapor from the gas and the formation of a brine, means for passing the brine in a direction counter to the direction of the incoming gas from the first housing portion for water vapor absorption from the gas, a hollow jacket surrounding said dehydration chamber in insulating relation thereto and providing an annular flow passage leading from the dehydration chamber outlet and receiving therefrom water vapor free gas and outlet means leading from the gas flow passage at a point adjacent the chamber inlet whereby water vapor free gas after having traveled through the body of dehydration material interiorly of the chamber exits through the annular gas flow passage and blankets the interior of the dehydration chamber throughout the length thereof to said outlet means.

3. Means for separating liquid from gas including a first chamber having a delivery passage leading thereto and a liquid outlet arranged to trap a body of liquid within the chamber to a desired level below said inlet, an annular partition dividing said chamber into a main compartment and a gas-liquid separating compartment and surrounding said inlet to direct entering liquid toward the bottom of said chamber and terminating downwardly below the liquid level therein and terminating upwardly above said inlet to direct gas into the chamber above said liquid level, a second chamber having communication for gas passage from the first chamber and being arranged to contain a water soluble dehydrating agent in solid particle form, and means to protect the second chamber and its particle content from sudden temperature change comprising a heat insulating hollow jacket surrounding said second chamber, an outlet connection leading from one end of said hollow jacket and an inlet connection leading to the other end of said hollow jacket from the second chamber at a point downstream of the dehydrating agent contained therein for the outflow of dehydrated gas as a sheath enveloping said second chamber between the inlet and outlet connections.

4. Means for separating liquid from gas including a housing having a gravity liquid and gas separating chamber in the lower portion thereof and a water vapor and gas separating chamber above the lower chamber, a body of solid particle water soluble dehydrating material contained in the upper chamber and which material is of a type that individual particles are liable to fuse together if subjected to sudden temperature drop, the wall of the housing in the region of said upper chamber being hollow and its hollow space communicating near one end with said upper chamber at a point downstream of the gas flow path through the dehydrating material and at its opposite end with an outlet whereby dry gas from which moisture has been absorbed by passage of the gas through the dehydrating material, flows from the chamber through the hollow wall as a chamber insulating envelope to protect said dehydrating material from the effect of sudden drop in temperature exteriorly of the housing.

References Cited in the file of this patent

UNITED STATES PATENTS

| | | |
|---|---|---|
| 2,353,138 | Beach | July 11, 1944 |
| 2,390,104 | Kaufman | Dec. 4, 1945 |
| 2,598,988 | Glasgow | June 3, 1952 |
| 2,765,868 | Parks | Oct. 9, 1956 |
| 2,790,505 | Dow | Apr. 30, 1957 |
| 2,804,940 | Hutchinson | Sept. 3, 1957 |
| 2,825,423 | Scheirman et al. | Mar. 4, 1958 |